US009836235B2

(12) United States Patent
Jain et al.

(10) Patent No.: US 9,836,235 B2
(45) Date of Patent: Dec. 5, 2017

(54) LOW POWER DISTRIBUTED MEMORY NETWORK

(71) Applicant: Marvell World Trade LTD., St. Michael (BB)

(72) Inventors: Kapil Jain, Santa Clara, CA (US); Wenzong Pan, Shanghai (CN); Cai Wang, Shanghai (CN)

(73) Assignee: Marvell World Trade LTD., St. Michael (BB)

( * ) Notice: Subject to any disclaimer, the term of this patent is extended or adjusted under 35 U.S.C. 154(b) by 123 days.

(21) Appl. No.: 14/700,755

(22) Filed: Apr. 30, 2015

(65) Prior Publication Data

US 2015/0324147 A1 Nov. 12, 2015

Related U.S. Application Data

(60) Provisional application No. 61/989,697, filed on May 7, 2014.

(51) Int. Cl.
*G06F 3/06* (2006.01)
*G06F 1/32* (2006.01)

(52) U.S. Cl.
CPC .......... *G06F 3/0625* (2013.01); *G06F 1/3212* (2013.01); *G06F 1/3287* (2013.01); *G06F 3/064* (2013.01); *G06F 3/0683* (2013.01); *Y02B 60/1292* (2013.01)

(58) Field of Classification Search
None
See application file for complete search history.

(56) References Cited

U.S. PATENT DOCUMENTS 5,940,627 A * 8/1999 Luciani .................. G06F 8/60
710/14
5,943,623 A * 8/1999 Yehushua ............ G06F 9/4887
455/550.1

(Continued)

FOREIGN PATENT DOCUMENTS

EP 0576409 A1 12/1993
WO WO-0070446 A2 11/2000

OTHER PUBLICATIONS

International Search Report for PCT/US2015/028591 dated Sep. 16, 2015.

(Continued)

*Primary Examiner* — Nitin Patel
*Assistant Examiner* — Joshua Neveln

(57) ABSTRACT

A digital signal processing (DSP) system includes an analog to digital converter, program random access memory (PRAM), N switching devices, and a control module. The analog to digital converter is configured to convert samples of an analog signal into digital samples. The PRAM includes: N PRAM blocks, where N is an integer greater than one; and code for M digital signal processing functions stored in the N PRAM blocks, where M is an integer greater than one. The N switching devices are configured to connect and disconnect the N PRAM blocks, respectively, to and from a power source. The control module is configured to: control the N switching devices; and execute selected ones of the M digital signal processing functions on the digital samples to produce an output.

14 Claims, 8 Drawing Sheets

(56) References Cited

U.S. PATENT DOCUMENTS

| | | | |
|---|---|---|---|
| 6,789,184 B1* | 9/2004 | Singh | G06F 9/30149 |
| | | | 712/205 |
| 2005/0144210 A1* | 6/2005 | Simkins | H03K 19/17736 |
| | | | 708/490 |
| 2008/0034234 A1 | 2/2008 | Shimizu et al. | |
| 2013/0031397 A1 | 1/2013 | Abe et al. | |

OTHER PUBLICATIONS

Written Opinion of the International Searching Authority for PCT/US2015/028591 dated Sep. 16, 2015.

* cited by examiner

LOW POWER DISTRIBUTED MEMORY NETWORK

CROSS-REFERENCE TO RELATED APPLICATIONS

This application claims the benefit of U.S. Provisional Application No. 61/989,697, filed on May 7, 2014. The entire disclosure of the application referenced above is incorporated herein by reference.

FIELD

The present disclosure relates to memory control systems and methods, and more particularly to systems and methods for reducing power consumption of systems including memory.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Volatile memory and non-volatile memory are two different types of memory. Data stored in some types of volatile memory may be lost when the memory is powered off. Data stored in non-volatile memory, however, may be retained even after the memory is powered off.

Various types of data may be stored in memory. For example, a digital signal processer (DSP) executes signal processing functions on input data, and the signal processing functions are stored in memory.

SUMMARY

A digital signal processing (DSP) system includes an analog to digital converter, program random access memory (PRAM), N switching devices, and a control module. The analog to digital converter is configured to convert samples of an analog signal into digital samples. The PRAM includes: N PRAM blocks, where N is an integer greater than one; and code for M digital signal processing functions stored in the N PRAM blocks, where M is an integer greater than one. The N switching devices are configured to connect and disconnect the N PRAM blocks, respectively, to and from a power source. The control module is configured to: control the N switching devices; and execute selected ones of the M digital signal processing functions on the digital samples to produce an output.

In other features, the DSP system further includes a register storing M indicators of whether or not to execute the M digital signal processing functions, respectively. The control module is configured to select and execute the selected ones of the M digital signal processing functions based on the M indicators stored in the register.

In other features, when one of the M indicators in the register indicates that execution of the one of the M digital signal processing functions is disabled, the control module disconnects one of the N PRAM blocks storing the one of the M digital signal processing functions from the power source during a period between a beginning of a digital sample and an end of the digital sample.

In other features, wherein the control module is configured to: selectively actuate one of the N switching devices to connect one of the N PRAM blocks to the power source; execute a portion of the code for one of the M digital signal processing functions stored in the one of the N PRAM blocks; and, after the execution of the portion of code for the one of the M digital signal processing functions, actuate the one of the N switching devices to disconnect the one of the N PRAM blocks from the power source.

In other features, the control module is configured to actuate the one of the N switching devices to connect the one of the N PRAM blocks to the power source in response to a determination that the one of the M signal processing functions is to be executed.

In other features, the control module is configured to begin executing the portion of the code for the one of the M digital signal processing functions that is stored in the one of the N PRAM blocks a predetermined period after the actuation of the one of the N switching devices to connect the one of the N PRAM blocks to the power source.

In other features, the DSP system further includes a counter configured to increment a counter value based on a clock signal. The control module is configured to execute lines of the code based on the counter value.

In other features, the control module is configured to selectively set the counter value to a line number of the code corresponding to a first line of the one of the M digital signal processing functions a predetermined period after the actuation of the one of the N switching devices to connect the one of the N PRAM blocks to the power source.

In other features, the control module is configured to maintain the counter value for the predetermined period after the actuation of the one of the N switching devices to connect the one of the N PRAM blocks to the power source.

In other features, the control module is configured to reset the counter value each time when a digital sample is received.

In other features, a method for reducing power consumption of a digital signal processing (DSP) system includes: converting samples of an analog signal into digital samples; and selectively connecting and disconnecting N program random access memory (PRAM) blocks to and from a power source using N switching devices, respectively. N is an integer greater than one, code for M digital signal processing functions is stored in the N PRAM blocks, and M is an integer greater than one. The method further includes controlling the N switching devices and executing selected ones of the M digital signal processing functions on the digital samples to produce an output.

In other features, the method further includes: storing in a register M indicators of whether or not to execute the M digital signal processing functions, respectively; and selecting and executing the selected ones of the M digital signal processing functions based on the M indicators stored in the register.

In other features, the method further includes, when one of the M indicators in the register indicates that execution of the one of the M digital signal processing functions is disabled, disconnecting one of the N PRAM blocks storing the one of the M digital signal processing functions from the power source during a period between a beginning of a digital sample and an end of the digital sample.

In other features, the method further includes: selectively actuating one of the N switching devices to connect one of the N PRAM blocks to the power source; executing a portion of the code for one of the M digital signal processing functions stored in the one of the N PRAM blocks; and, after the execution of the portion of code for the one of the M digital signal processing functions, actuating the one of the N switching devices to disconnect the one of the N PRAM blocks from the power source.

In other features, the method further includes actuating the one of the N switching devices to connect the one of the N PRAM blocks to the power source in response to a determination that the one of the M signal processing functions is to be executed.

In other features, the method further includes beginning executing the portion of the code for the one of the M digital signal processing functions that is stored in the one of the N PRAM blocks a predetermined period after the actuation of the one of the N switching devices to connect the one of the N PRAM blocks to the power source.

In other features, the method further includes: incrementing a counter value based on a clock signal; and executing lines of the code based on the counter value.

In other features, the method further includes selectively setting the counter value to a line number of the code corresponding to a first line of the one of the M digital signal processing functions a predetermined period after the actuation of the one of the N switching devices to connect the one of the N PRAM blocks to the power source.

In other features, the method further includes maintaining the counter value for the predetermined period after the actuation of the one of the N switching devices to connect the one of the N PRAM blocks to the power source.

In other features, the method further includes resetting the counter value each time when a digital sample is received.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Digital signal processing functions are applied to digital samples to perform digital signal processing (DSP). The signal processing functions may be stored in memory and are executed line-by-line as a counter increments. Whether or not to execute selected ones of the signal processing functions can be set, for example, by a user or by a device including a DSP system.

Power consumption can be reduced, however, if portions of the memory including signal processing functions that are not to be executed are powered off. Additionally, power consumption can be reduced by powering off portions of memory outside of periods when one or more signal processing functions within the respective portions are executed.

According to the present disclosure, the memory is divided into a plurality of memory blocks that can be powered on and off independently. One or more of the signal processing functions are stored in each of the memory blocks. Memory blocks that do not include one or more signal processing functions that are to be executed are powered off. Memory blocks that include one or more signal processing functions that are to be executed are powered on for execution of the one or more signal processing functions and powered off otherwise. Power consumption is thereby reduced relative to powering on the entire memory.

Figure 1:
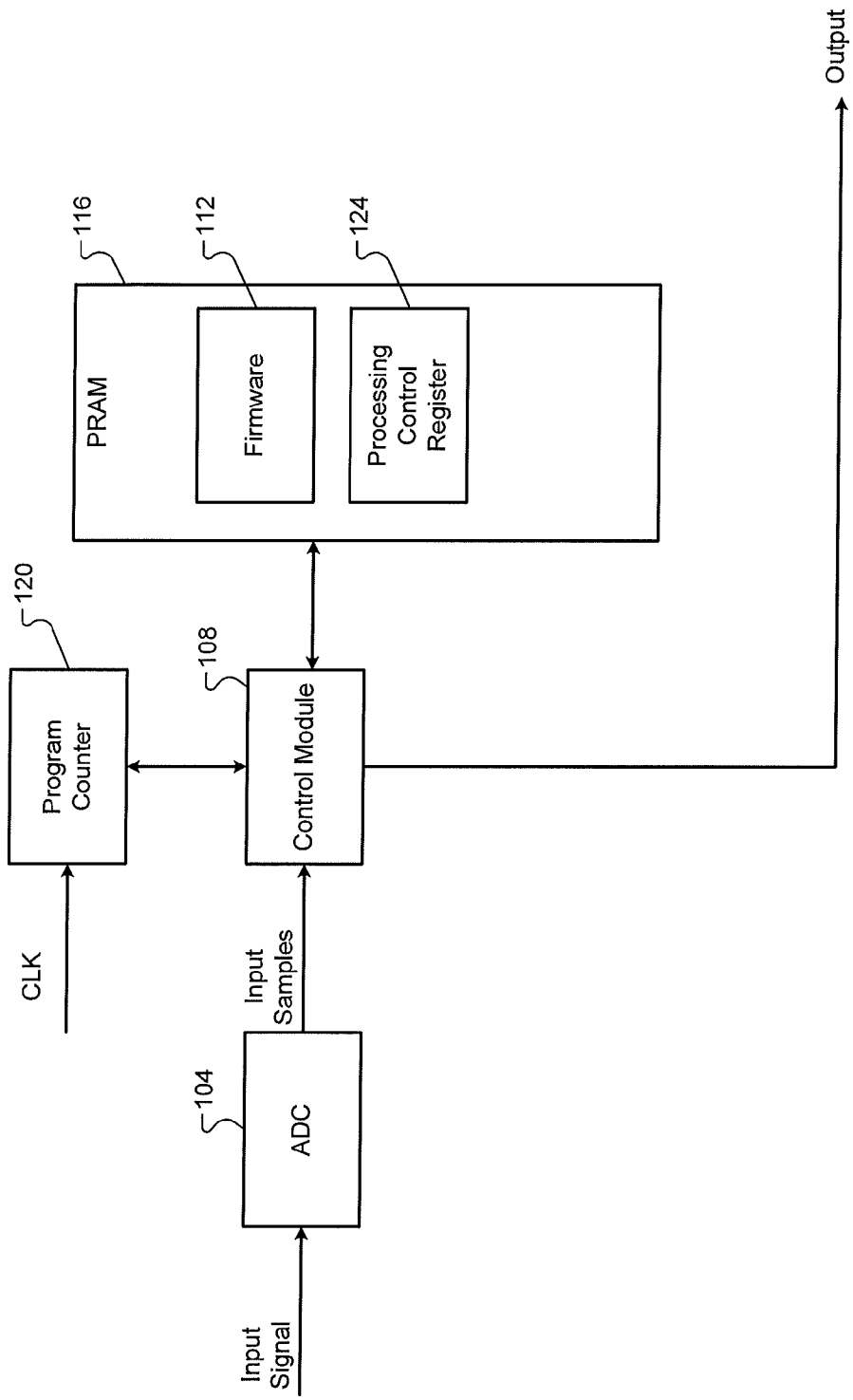
FIG. 1 is a functional block diagram of an example digital signal processing system.

FIG. 1 shows a digital signal processing (DSP) system. An analog to digital converter (ADC) 104 converts samples of an analog input signal to digital input samples. A control module 108 executes one or more signal processing functions on digital input samples to generate an output. The digital signal processing functions are implemented in firmware 112, which is stored in Program Random Access Memory (PRAM) 116.

A program counter (PC) 120 is used to read the PRAM 116. The PC 120 increments by 1 in response to each cycle of a clock signal (CLK). The frequency of the clock signal is greater than the sampling frequency of the ADC 104. The control module 108 resets the PC 120 to zero when a digital input sample is received. The control module 108 determines the value of the PC 120 and reads and executes the corresponding line of the firmware 112. In this manner, the control module 108 reads and executes the firmware 112, thereby processing the digital input sample using the signal processing functions, line-by-line until the end of the firmware 112 is reached. This is performed for each received digital input sample.

A plurality of possible signal processing functions that can be executed may be stored in the firmware 112. The stored signal processing functions that are executed and the stored signal processing functions that are not executed can be set, for example, by a user or a system including the digital signal processing system. While the example of audio digital signal processing is provided and discussed, the present disclosure is applicable to digital signal processing of other types of signals.

A processing control register 124, such as an I-two-C (I2C) register indicates whether or not to execute the stored signal processing functions. The processing control register 124 may be referred to as an audio processing control register. An example table illustrative of data included in the processing control register 124 where 8 signal processing functions, f1, g1, f2, g2, f3, g3, f4, and g4 are stored in the firmware 112 is set forth below:

| Number | Function name | Enabled/disabled indicator |
|---|---|---|
| 0 | f1 | If 1'b0, function f1 is disabled. If 1'b1, function f1 is enabled |
| 1 | g1 | If 1'b0, function g1 is disabled. If 1'b1, function g1 is enabled |
| 2 | f2 | If 1'b0, function f2 is disabled. If 1'b1, function f2 is enabled |

-continued

| Number | Function name | Enabled/disabled indicator |
|---|---|---|
| 3 | g2 | If 1'b0, function g2 is disabled. If 1'b1, function g2 is enabled |
| 4 | f3 | If 1'b0, function f3 is disabled. If 1'b1, function f3 is enabled |
| 5 | g3 | If 1'b0, function g3 is disabled. If 1'b1, function g3 is enabled |
| 6 | f4 | If 1'b0, function f4 is disabled. If 1'b1, function f4 is enabled |
| 7 | g4 | If 1'b0, function g4 is disabled. If 1'b1, function g4 is enabled |

The processing control register 124 includes the indicators (e.g., flags) for the respective signal processing functions. The indicators indicate whether the signal processing functions, respectively, are to be executed (enabled) or not (disabled). For example, an indicator of 1'b1 in the processing control register 124 may indicate that the associated signal processing function is to be executed. Another indicator, such as an indicator of 1'b0, may indicate that the associated signal processing function is not to be performed.

The control module 108 may execute an instruction/command to determine the states of the indicators in the processing control register 124. An example of such an instruction/command includes the Stata cond( ) function. In one example, the instruction to determine whether to execute a stored signal processing function may be stored on the line that immediately precedes the first line of the code for that signal processing function. One such instruction may be stored in the firmware 112 for each of the stored signal processing functions.

When an indicator indicates that the respective signal processing function is to be executed, the control module 108 executes the corresponding lines of the firmware as the PC 120 increments. When an indicator indicates that the respective signal processing function is not to be executed, the control module 108 executes an instruction/command to skip the lines of the firmware 112 for that signal processing function. More specifically, the control module 108 sets the PC 120 to the first line of a next one of the signal processing functions to be executed when a signal processing function is not to be executed. In this manner, only the enabled signal processing functions will be executed.

Figure 2:
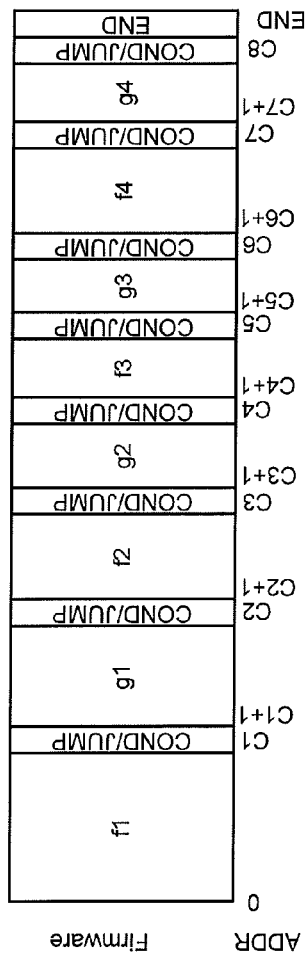
FIG. 2 includes an example data structure for firmware including multiple signal processing functions.

For example, when the processing control register 124 [7:0] is set to 7'b01010101, only signal processing functions f1, f2, f3 and f4 will be executed, and signal processing functions g1, g2, g3, and g4 will not be executed. FIG. 2 includes an illustration of an example data structure for firmware including eight signal processing functions f1-f4 and g1-g4 and respective commands to check the processing control register 124 to determine whether to execute the signal processing functions.

As an example only, the signal processing functions will be discussed as being performed in the following order: f1, f2, f3, f4, g1, g2, g3, and g4. Commands to check the processing control register 124 to determine whether or not to execute the respective signal processing functions are stored immediately before the signal processing functions. For example, a command to check the processing control register 124 to determine whether to execute the signal processing function f1 is stored at line zero (0), immediately before the first line of the code for signal processing function f1, line 1. Code for signal processing function f1 occupies lines 1 through C1−1. A command to check the processing control register 124 to determine whether to execute the signal processing function f2 is stored at line C2, immediately before the code for signal processing function f2. Code for signal processing function f2 occupies lines C2+1 through C3−1. A command to check the processing control register 124 to determine whether to execute the signal processing function g2 is stored at line C3, and so on.

Figure 3:
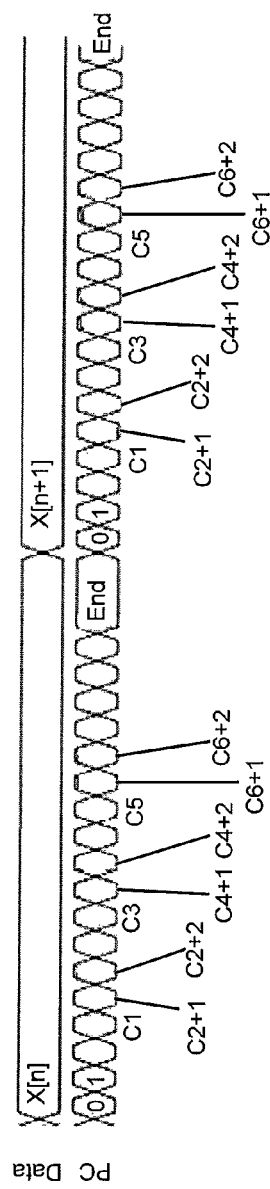
FIGS. 3, 4, and 5 include example timing diagrams for executing different example sets of the signal processing functions.

FIG. 3 includes a timing diagram for the example where signal processing functions f1-f4 are executed and signal processing functions g1-g4 are not executed. When a digital sample X[n] is received, the control module 108 resets the PC 120 to 0 as shown in FIG. 3. When the PC 120 is equal to 0, the control module 108 reads line 0, thereby checking the processing control register 124 to determine whether to execute the signal processing function f1. When the indicator for the signal processing function f1 indicates that signal processing function f1 should be executed, the control module 108 executes the first line of the signal processing function f1 when the PC 120 is at 1. The control module 108 continues executing the signal processing function f1 line-by-line as the PC 120 increments.

The instruction to check the processing control register 124 to determine whether to execute the signal processing function g1 is stored on line C1 of the firmware 112. In this example, signal processing function g1 is not to be executed.

When a signal processing function is not to be executed, the control module 108 determines the next one of the signal processing functions that is to be executed. The control module 108 then sets the PC 120 to the first line of the firmware 112 for that one of the signal processing functions.

The control module 108 determines the next one of the signal processing functions that is to be executed by executing the instructions to check the processing control register 124 to determine whether to execute the associated signal processing function. More specifically, the instructions stored on lines C0, C1, C2, C3, C4, C5, C6, C7, and C8 are executed in that order to determine whether the respective signal processing function are to be executed. For example, even if signal processing function g1 is not to be executed (as indicated in the processing control register 124), line C1 is executed to look to the processing control register 124 for the indicator for signal processing function g1. In the example of FIG. 3, for sample x[n], after checking if signal processing function g1 is to be executed via the execution of line C1 (and determining that g1 is not to be executed), the control module 108 next executes line C2, which checks if signal processing function f1 is to be executed via signal processing function f1's indicator in the processing control register 124. Stated generally, when a signal processing function is not to be executed, the control module 108 updates the PC 120 to the next one of the lines where an instruction to check the processing control register 124 is stored. When a signal processing function is to be executed, the control module 108 executes the signal processing function as the PC 120 increments.

In the example of FIG. 3, signal processing function f2 is the next one of the signal processing functions to be executed. Signal processing function f2 is then executed line-by-line as the PC 120 increments.

The instruction to check the processing control register 124 for whether to execute the signal processing function g2 is stored on line C3 of the firmware 112. In this example, signal processing function g2 is also not to be executed. The control module 108 therefore updates the PC 120 to line C4 to check whether signal processing function f3 is to be executed. In this example, signal processing function f3 is to be executed. As such, the control module 108 executes signal processing function f3 line-by-line as the PC 120 increments.

Figure 4:
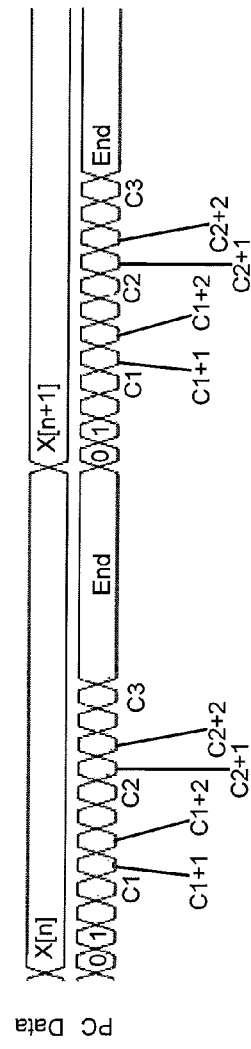

This process continues until the end of the firmware 112 is reached, at which point the control module 108 will have performed the enabled ones of the signal processing functions on the digital input sample X[n], skipped the disabled ones of the signal processing functions, and generated the corresponding output. Execution of the firmware 112 will start over when a next digital input sample X[n+1] is received. FIG. 4 includes a timing diagram where signal processing functions f1, g1, and f2 are executed and signal processing functions g2, f3, g3, f4, and g4 are not executed.

Power may be consumed unnecessarily if the entire PRAM 116 is powered on throughout the time when the PC 120 is counting. For example, unnecessary power consumption may occur if the PRAM 116 is powered ON throughout the time when the PC 120 is running when less than all of the signal processing functions are to be executed. Also, as only one of the signal processing functions is executed at any given time, due to the line-by-line execution of the firmware 112, unnecessary power may be consumed to power on the portions of the PRAM 116 that are not being used.

Figure 5:
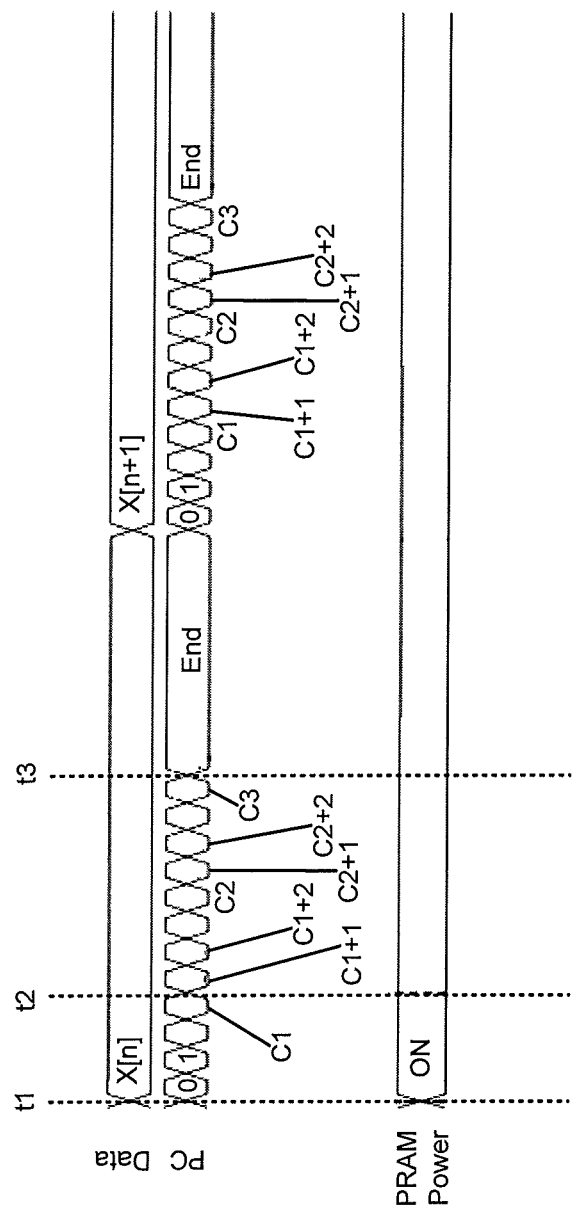

FIG. 5 includes a timing diagram for the example where signal processing functions f1, g1, and f2 are executed and signal processing functions g2, f3, g3, f4, and g4 are not executed. Between times t1 and t2, only the portion of the firmware 112 associated with the signal processing function f1 is being used. Power consumption can be reduced if other portions of the PRAM 116 that are not being used are powered off between times t1 and t2. Additionally, all of the signal processing functions that are to be executed are executed between times t1 and t3. Power consumption can be reduced by powering off memory until the next digital input sample is received.

Figure 6:
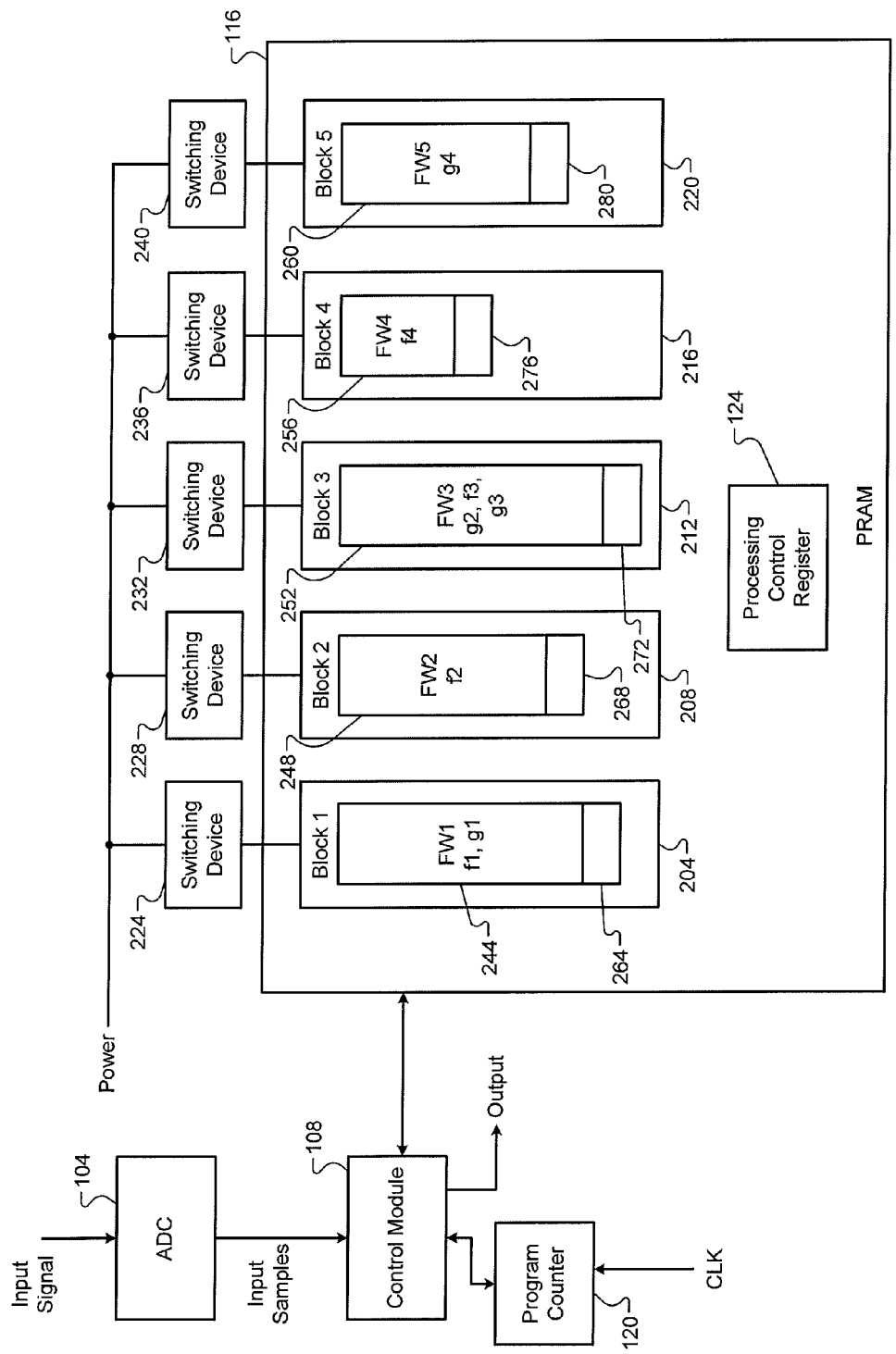
FIG. 6 includes a functional block diagram of a digital signal processing function.

FIG. 6 includes another functional block diagram of the digital signal processing system. The PRAM 116 is divided into a plurality of separately powered memory blocks, such as memory blocks 204, 208, 212, 216, and 220. The memory blocks may also be referred to as memory islands. While the example of the PRAM 116 including five memory blocks is provided and will be described, the PRAM 116 may include two or more memory blocks. The memory blocks 204, 208, 212, 216, and 220 may be the same (storage) size or may have different sizes.

The signal processing functions are categorized, and one or more categories of signal processing functions may be stored in each memory block. Signal processing functions that are larger than the size of a memory block may be stored in two or more different memory blocks. One category includes mandatory signal processing functions that should always be executed. Other signal processing functions are optional signal processing functions that may or may not be executed. Optional signal processing functions are categorized together and stored in one or more of the memory blocks. Optional signal processing functions include optional signal processing functions that can be performed independently of all other signal processing functions and optional signal processing functions that, when executed, are executed with one or more other optional signal processing functions.

Switching devices 224, 228, 232, 236, and 240 control connection/disconnection of the memory blocks 204, 208, 212, 216, and 220, respectively, to and from a power supply. In this manner, the memory blocks 204, 208, 212, 216, and 220 can be powered on or off independently of each other one of the memory blocks 204, 208, 212, 216, and 220. While the switching devices 224, 228, 232, 236, and 240 are shown as being external to the PRAM 116, the switching devices 224, 228, 232, 236, and 240 may be implemented within the PRAM 116. The control module 108 controls the switching devices 224, 228, 232, 236, and 240 to control powering of the memory blocks 204, 208, 212, 216, and 220, respectively.

Each of the memory blocks 204, 208, 212, 216, and 220 has retention capability. Accordingly, when powered off, the memory blocks 204, 208, 212, 216, and 220 preserve their content. The control module 108 powers on the memory blocks 204, 208, 212, 216, and 220 only when a signal processing function stored within that memory block is being executed or for a period immediately before execution. By default, all of the memory blocks 204, 208, 212, 216, and 220 may be powered off.

The following will be described in terms of the example order of execution of the signal processing functions provided above, namely f1, g1, f2, g2, f3, g3, f4, and then g4. The firmware may be stored such that the memory blocks 204, 208, 212, 216, and 220 are addressed in the following example order, memory block 204, memory block 208, memory block 212, memory block 216, then memory block 220.

Different portions of the firmware 112 are stored memory blocks 204, 208, 212, 216, and 220. For example, firmware portions 244, 248, 252, 256, and 260 are illustrated in FIG. 6. One or more mandatory signal processing functions are stored first in the firmware 112, such as beginning at line zero, which is in the memory block 204 in the example order provided above. In the example of FIG. 6, signal processing functions f1 and g1 are mandatory signal processing functions and are stored in firmware portion 244 in the memory block 204.

Signal processing function f2 is stored in the firmware portion 248 in the memory block 208. Signal processing functions g2, f3, and g3 are optional signal processing functions that are executed together, when enabled, and are stored in firmware portion 252 in the memory block 212. Signal processing functions f4 and g4 are optional signal processing functions that can be executed independently, when enabled, and are stored in the firmware portions 256 and 260 in the memory blocks 216 and 220, respectively.

The control module 108 powers on the memory block where the signal processing function corresponding to line zero is stored when a digital input sample is received. In the example of FIG. 6, the control module 108 powers on memory block 204, where mandatory signal processing functions f1 and g1 are stored, when a digital input sample is received. The control module 108 then executes firmware portion 244 including the mandatory signal processing functions f1 and g1 line-by-line as the PC 120 increments, as described above.

Each of the firmware portions includes an instruction to check the processing control register 124 to determine the next one of the signal processing functions that is to be executed. These instructions/commands are in the respective last lines of the firmware portions. For example, these instructions/commands are illustrated in FIG. 6 by sections 264, 268, 272, 276, and 280 in the memory blocks 204, 208, 212, 216, and 220, respectively.

Each of the sections also includes indicators of periods necessary for later memory blocks to be powered on before firmware stored therein can be executed. For example, the section 264 includes indicators of periods necessary for the memory blocks 208, 212, 216, and 220 to be powered on before the firmware portions 248, 252, 256, and 260, respectively, can be executed. The section 268 includes indicators of periods necessary for the memory blocks 212, 216, and 220 to be powered on before the firmware portions 252, 256, and 260, respectively, can be executed. The sections may include, for example, numbers of buffer cycle firmware lines corresponding to the respective periods.

The period for a memory block to be powered on before its content can be executed may be referred to as a wake up period of that memory block. The wake up periods of the memory blocks may be the same or different. The wake up periods may be different, for example, when memory blocks of different sizes are used.

The control module 108 sets the PC 120 to the first line of the next one of the signal processing functions that is to be executed, powers on the one of the memory blocks 208, 212, 216, and 220 where that signal processing function is stored, and maintains the PC 120 at that value for that memory block's wake up period. Maintaining the PC 120 may mean holding the value of the PC 120 and stopping the PC 120 from incrementing. The control module 108 powers on a memory block by closing the switching device associated with that memory block. The control module 108 powers off the memory block that was previously powered on after the next memory block's wake up period has passed.

Figure 7:
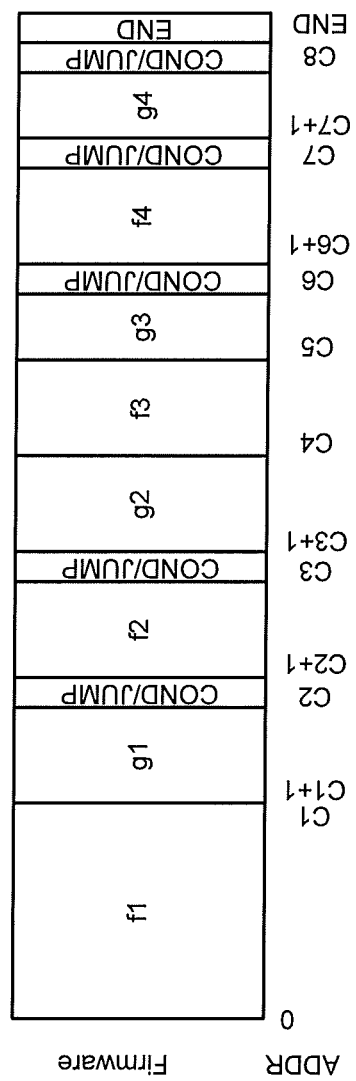
FIG. 7 includes an example data structure for firmware including multiple signal processing functions.

FIG. 7 includes an illustration of an example data structure for firmware including the eight signal processing functions f1-f4 and g1-g4 as described above with the example of FIG. 6. As described above, commands to check the processing control register 124 to determine which signal processing functions are to be executed are included at the end of each firmware portion.

Figure 8:
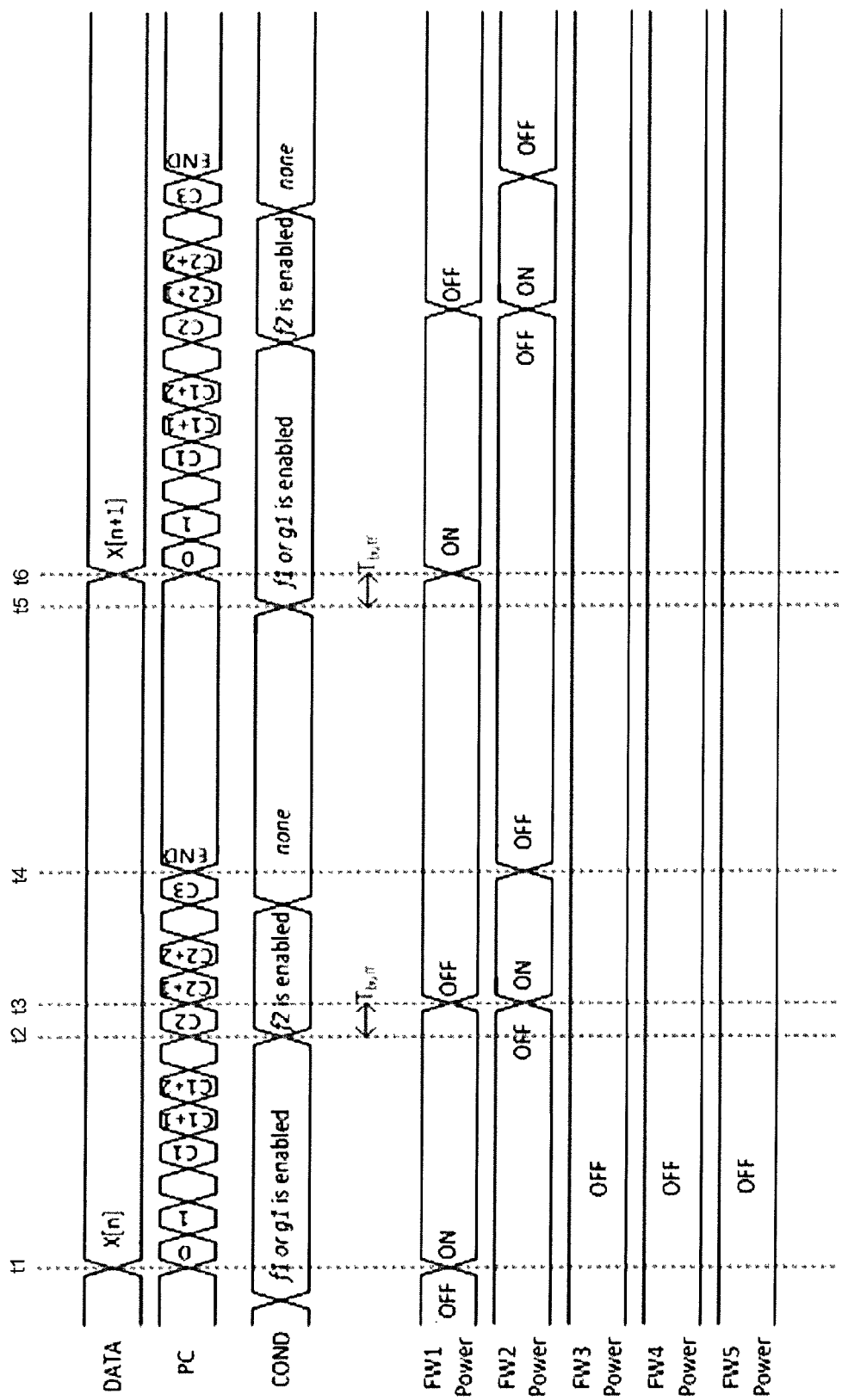
FIGS. 8 and 9 include example timing diagrams for executing different example sets of the signal processing functions.

FIG. 8 includes a timing diagram illustrating operation of the example of FIG. 6 for the example case where signal processing functions f1, g1, and f2 are executed and signal processing functions g2, 13, g3, f4, and g4 are not executed. FIG. 8 also indicates usability/power states of each of the firmware portions. For example, FW1 power in FIG. 8 indicates whether the memory block 204 has been powered on for at least its wake up period such that the firmware portion 244 can be executed (ON) or not (OFF). FW2 power in FIG. 8 indicates whether the memory block 208 has been powered on for at least its wake up period such that the firmware portion 248 can be executed (ON) or not (OFF), etc.

A digital input sample x[n] is received at time t1, and the control module 108 resets the PC 120 to zero. The memory block 204 includes the mandatory signal processing functions f1 and g1, which are to be executed in this example. Thus, memory block 204 is powered on at time t1, as indicated by FW1 power being ON in FIG. 8. All of the other memory blocks are powered off to minimize power consumption.

Signal processing function f1 occupies firmware lines 0 through C1, and signal processing function g1 occupies firmware lines C1+1 through C2−1. The memory block 204's command to check the processing control register 124 to determine the next signal processing function to be executed occupies firmware line C2. Since signal processing functions f1 and g1 are to be executed in this example, the control module 108 executes lines 0 through C2, line-by-line, as the PC 120 increments.

At line C2, the control module 108 checks the processing control register 124 to determine the next signal processing function to be executed. In this example, signal processing function f2 is next to be executed. Since signal processing function f2 is stored in the memory block 208, the control module 108 powers on the memory block 208 via closing the switching device 228 at time t2. The wake up period for the memory block 208 corresponds to the period between time t2 and time t3. The control module 108 maintains the PC 120 at C2 until time t3, when firmware within the memory block 208 can be executed.

At time t3, the memory block 208 has been powered on for its wake up period (as indicated in FIG. 8 by FW2 power transitioning from OFF to ON at time t3), so the firmware portion 248 can be executed. The control module 108 powers off the memory block 204 at time t3, and all of the other memory blocks remain powered off.

Signal processing function f2 occupies firmware lines C2+1 through C3−1. The memory block 208's command to check the processing control register 124 to determine the next signal processing function to be executed occupies firmware line C3. The control module 108 executes lines C2+1 through C3, line-by-line, as the PC 120 increments.

At line C3, the control module 108 again checks the processing control register 124 to determine the next signal processing function to be executed. In this example, no other signal processing functions are to be executed on the digital input sample x[n]. As such, the control module 108 determines that the next signal processing function to be executed is signal processing function f1, which is stored in the memory block 204. The control module 108 therefore powers off the memory block 208 at time t4. The control module 108 powers off the memory block 208 by opening the switching device 228.

The control module 108 maintains all of the memory blocks 204, 208, 212, 216, and 220 powered off until time t5. A next digital input sample x[n+1] is received at time t6. The period between times t5 and t6 corresponds to the wake up period for the memory block 204, where the next signal processing function to be executed (f1) is stored. Since the next signal processing function to be executed is stored in the memory block 204, the control module 108 powers on the memory block 204 by closing the switching device 224 at time t5. Thus, the memory block 204 has been powered on for its wake up period at time t6, and the next signal processing function to be executed, namely signal processing function f1 in this case on the next digital input sample x[n+1], can be executed beginning at time t6. This process continues for each digital input sample unless the processing control register 124 is adjusted, such as by a user.

Figure 9:
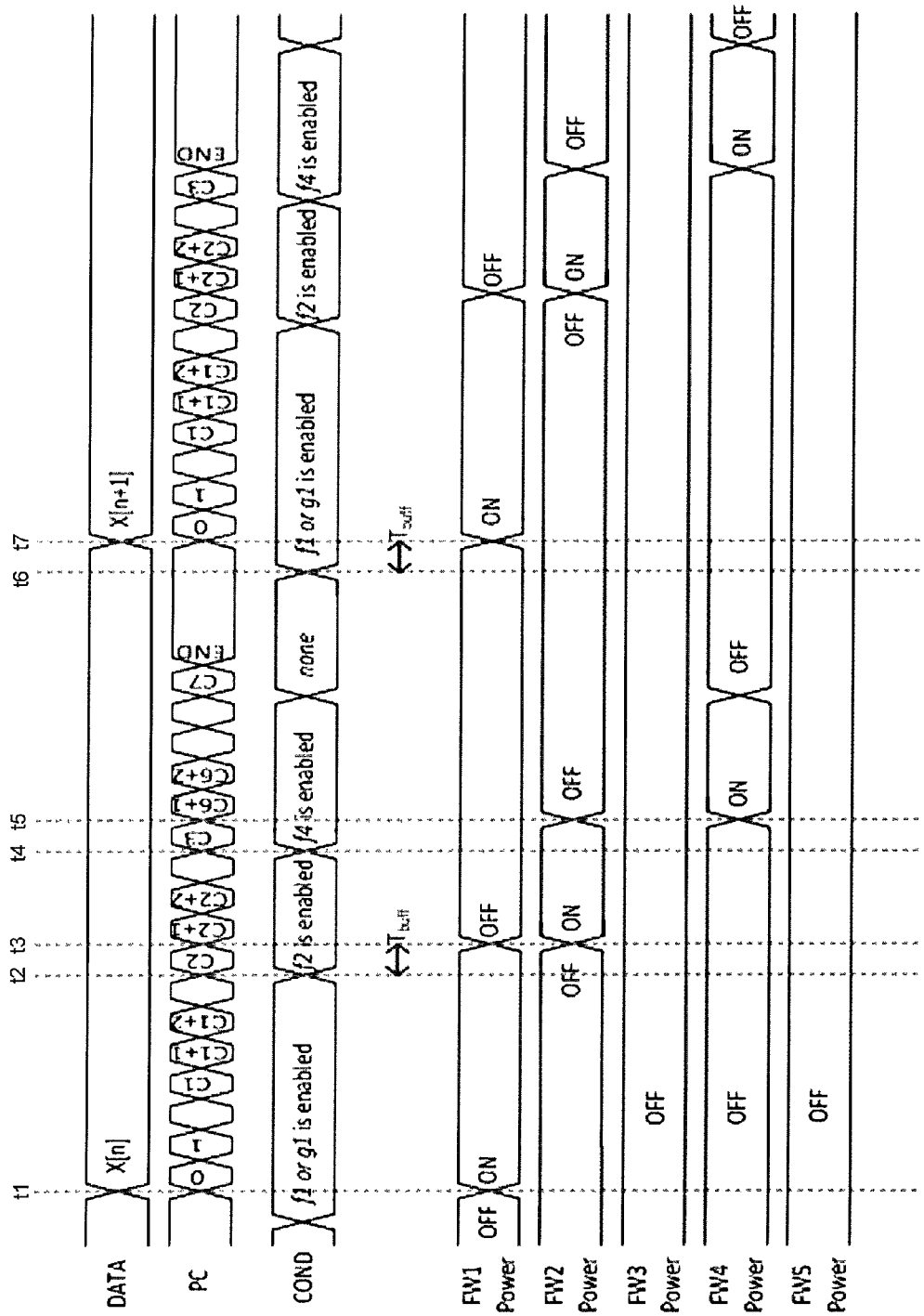

FIG. 9 includes a timing diagram for the example case where signal processing functions f1, g1, f2, and f4 are executed and signal processing functions g2, f3, g3, and g4 are not executed. A digital input sample x[n] is received at time t1, so the control module 108 resets the PC 120 to 0. Lines 0 through C3 are executed as described above in conjunction with the example of FIG. 8.

At line C3, the control module 108 checks the processing control register 124 to determine the next signal processing function to be executed. In this example, signal processing function f4 is the next to be executed on the digital input sample x[n]. Since signal processing function f4 is stored in the memory block 216, the control module 108 powers on the memory block 216 via closing the switching device 236 at time t4. The wake up period for the memory block 216 corresponds to the period between time t4 and time t5. The control module 108 maintains the PC 120 at C3 until time t5, when firmware within the memory block 216 can be executed.

At time t5, the memory block 216 has been powered on for its wake up period (as indicated in FIG. 9 by FW4 power transitioning from OFF to ON at time t5), so the firmware portion 256 can be executed. The control module 108 powers off the memory block 204 at time t5, and all of the other memory blocks remain powered off.

Signal processing function f4 occupies firmware lines C6+1 through C7−1. The memory block 216's command to check the processing control register 124 to determine the next signal processing function to be executed occupies firmware line C7. The control module 108 executes lines C6+1 through C7, line by line, as the PC 120 increments.

At line C7, the control module 108 again checks the processing control register 124 to determine the next signal processing function to be executed. In this example, no other signal processing functions are to be executed for the digital input sample x[n]. As such, the control module 108 determines that the next signal processing function to be executed is signal processing function f1 on the next digital input sample x[n+1], which is stored in the memory block 204. The control module 108 therefore powers off the memory block 216 at line C7. The control module 108 powers off the memory block 216 by opening the switching device 236.

The control module 108 maintains all of the memory blocks 204, 208, 212, 216, and 220 powered off until time t6. A next digital input sample x[n+1] is received at time t7. The period between times t6 and t7 corresponds to the wake up period for the memory block 204, where the next signal processing function to be executed is stored. Since the next signal processing function to be executed is stored in the memory block 204, the control module 108 powers on the memory block 204 by closing the switching device 224 at time t6. Thus, the memory block 204 has been powered on for its wake up period at time t7, and the next signal processing function to be executed, namely signal processing function f1 in this example, can be executed beginning at time t7. This process continues for each digital input sample unless the processing control register 124 is adjusted, such as by a user.

Figure 10:
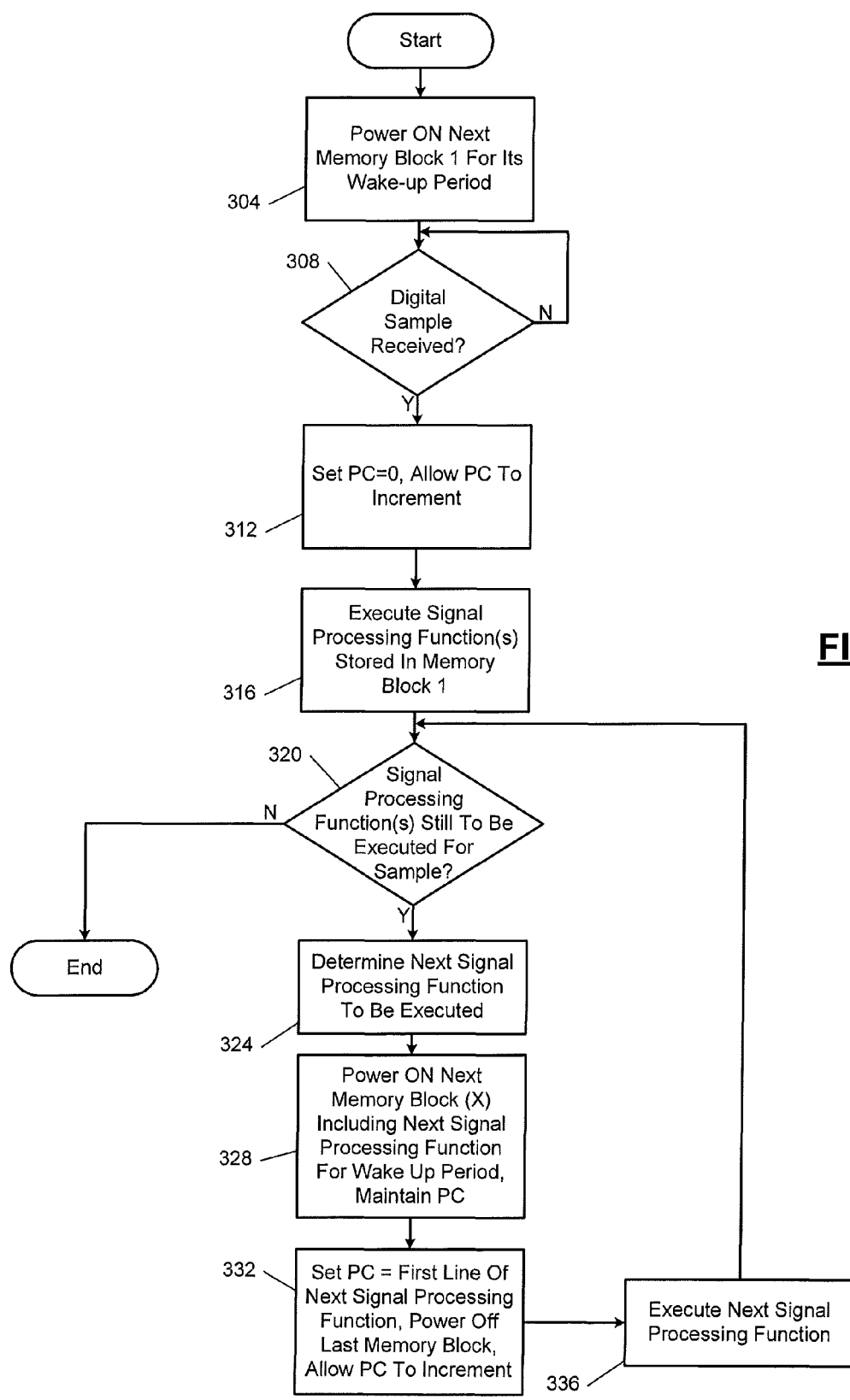
FIG. 10 includes a flowchart depicting an example method of powering on and off memory blocks.

FIG. 10 is a flowchart including an example method of powering on and off memory blocks. Control begins at 304 where the control module 108 powers on the first memory block where the first signal processing function to be executed for each received digital sample is stored. For example, the control module 108 powers on the memory block 204 in the example of FIG. 6. All of the other memory blocks may remain powered off at 304. The control module 108 may power on the first memory block, for example, when the PC 120 reaches a predetermined value. The period between the time when the PC 120 is equal to the predetermined value and the time when the next digital input sample is received may be greater than or equal to the wake up period of the first memory block.

At 312, when the digital input sample is received, the control module 108 sets the PC 120 equal to zero and allows the PC 120 to increment. The PC 120 increments based on the clock signal. At 316, the control module 108 executes one or signal processing functions stored in the first memory block, line-by-line, as the PC 120 increments. At 320, the control module 108 determines whether one or more signal processing functions are still to be executed for the digital input sample (received at 308). The control module 108 determines whether one or more signal processing functions are still to be executed using the processing control register 124. If 320 is true, control continues with 324. If 320 is false, control may end. While FIG. 10 is shown as ending, control may return to 304 for a next digital input sample.

The control module 108 determines the next signal processing function that is to be executed using the processing control register 124 at 324. At 328, the control module 108 powers on the memory block where that signal processing function is stored. Since that memory block was previously powered off however, the memory block is powered on for its wake-up period before the next signal processing function is executed. The control module 108 maintains the PC 120 at 328.

At 332, when the wake-up period has elapsed, the control module 108 sets the PC 120 to the value corresponding to the first line of the next signal processing function to be executed. The control module 108 also allows the PC 120 to increment at 332 and powers off the last memory block that was powered on. The first time that 332 is encountered, for example, the control module 108 powers off the first memory block. At 336, the control module 108 executes the next signal processing function line-by-line according to the PC 120. Control may then return to 320. Powering on the memory blocks only as needed for execution of a signal processing function stored therein reduces power consumption.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A digital signal processing (DSP) system comprising:
   an analog to digital converter configured to convert samples of an analog signal into digital samples;
   program random access memory (PRAM) including:
   N PRAM blocks, wherein N is an integer greater than one; and
   code for M digital signal processing functions stored in the N PRAM blocks, wherein M is an integer greater than one, and
   wherein last lines of the code for each of the M digital signal processing functions includes: (i) an instruction to determine a next one of the M digital signal processing functions to be executed; and (ii) an indicator of a wake up period of one of the N PRAM blocks where the next one of the M digital signal processing functions is stored;
   N switching devices configured to connect and disconnect the N PRAM blocks, respectively, to and from a power source; and
   a control module configured to:
   control the N switching devices; and
   read and execute, from the PRAM, selected ones of the M digital signal processing functions on the digital samples to produce an output,
   wherein the control module is configured to:
   selectively actuate a first one of the N switching devices to connect a first one of the N PRAM blocks to the power source;
   execute a first portion of the code for a first one of the M digital signal processing functions stored in the first one of the N PRAM blocks;
   in response to executing the last line of the code for the first one of the M digital signal processing functions: (i) determine a second one of the M digital signal processing functions that is to be executed next after the first one of the M digital signal processing functions; and (ii) determine a wake up period of a second one of the N PRAM blocks where the second one of the M digital signal processing functions is stored;
   actuate the first one of the N switching devices to disconnect the first one of the N PRAM blocks from the power source after the execution of the last line of code for the first one of the M digital signal processing functions;
   based on the determination that the second one of the M digital signal processing functions is to be executed next after the first one of the M digital signal processing functions, selectively actuate a second one of the N switching devices to connect the second one of the N PRAM blocks to the power source; and
   in response to passing of the wake up period of the second one of the N PRAM blocks after the actuation of the second one of the N switching devices to connect the second one of the N PRAM blocks to the power source, begin executing a second portion of the code for the second one of the M digital signal processing functions.

2. The DSP system of claim 1, further comprising a register storing M indicators of whether or not to execute the M digital signal processing functions, respectively,
   wherein the control module is configured to select and execute the selected ones of the M digital signal processing functions based on the M indicators stored in the register.

3. The DSP system of claim 2, wherein, when one of the M indicators in the register indicates that execution of a third of the M digital signal processing functions is disabled, the control module is configured to disconnect a third one of the N PRAM blocks storing the third one of the M digital signal processing functions from the power source during a period between a beginning of a digital sample and an end of the digital sample.

4. The DSP system of claim 1, further comprising a counter configured to increment a counter value based on a clock signal,
wherein the control module is configured to execute lines of the code based on the counter value.

5. The DSP system of claim 4, wherein the control module is configured to selectively set the counter value to a line number of the code corresponding to a first line of the code for the second one of the M digital signal processing functions a the wake up period after the actuation of the second one of the N switching devices to connect the second one of the N PRAM blocks to the power source.

6. The DSP system of claim 4, wherein the control module is configured to maintain the counter value for the wake up period after the actuation of the second one of the N switching devices to connect the second one of the N PRAM blocks to the power source.

7. The DSP system of claim 4, wherein the control module is configured to reset the counter value each time when a digital sample is received.

8. A method for reducing power consumption of a digital signal processing (DSP) system, the method comprising:
converting samples of an analog signal into digital samples;
selectively connecting and disconnecting N program random access memory (PRAM) blocks to and from a power source using N switching devices, respectively, wherein N is an integer greater than one,
wherein code for M digital signal processing functions is stored in the N PRAM blocks, and
wherein M is an integer greater than one, and
wherein last lines of the code for each of the M digital signal processing functions includes: (i) an instruction to determine a next one of the M digital signal processing functions to be executed; and (ii) an indicator of a wake up period of one of the N PRAM blocks where the next one of the M digital signal processing functions is stored;
controlling the N switching devices; and
reading and executing, from the PRAM, selected ones of the M digital signal processing functions on the digital samples to produce an output,
wherein the controlling and the reading and executing include:
selectively actuating a first one of the N switching devices to connect a first one of the M digital signal processing functions to the power source;
executing a first portion of the code for a first one of the M digital signal processing functions stored in the first one of the N PRAM blocks;
in response to executing the last line of the code for the first one of the N PRAM blocks: (i) determining a second one of the M digital signal processing functions that is to be executed next after the first one of the M digital signal processing functions; and (ii) determining a wake up period of a second one of the N PRAM blocks where the second one of the M digital signal processing functions is stored;
actuating the first one of the N switching devices to disconnect the first one of the N PRAM blocks from the power source after the execution of the last line of the code for the first one of the M digital signal processing functions;
based on the determination that the second one of the M digital signal processing functions is to be executed next after the first one of the M digital signal processing functions, selectively actuating a second one of the N switching devices to connect the second one of the N PRAM blocks to the power source; and
in response to passing of the wake up period of the second one of the N PRAM blocks after the actuation of the second one of the N switching devices to connect the second one of the N PRAM blocks to the power source, beginning to execute a second portion of the code for the second one of the M digital signal processing functions.

9. The method of claim 8 further comprising:
storing in a register M indicators of whether or not to execute the M digital signal processing functions, respectively; and
selecting and executing the selected ones of the M digital signal processing functions based on the M indicators stored in the register.

10. The method of claim 9, further comprising, when one of the M indicators in the register indicates that execution of a third one of the M digital signal processing functions is disabled, disconnecting a third one of the N PRAM blocks storing the third one of the M digital signal processing functions from the power source during a period between a beginning of a digital sample and an end of the digital sample.

11. The method of claim 8, further comprising:
incrementing a counter value based on a clock signal; and
executing lines of the code based on the counter value.

12. The method of claim 11, further comprising selectively setting the counter value to a line number of the code corresponding to a first line of the code for the second one of the M digital signal processing functions the wake up a period after the actuation of the second one of the N switching devices to connect the second one of the N PRAM blocks to the power source.

13. The method of claim 11, further comprising maintaining the counter value for the wake up period after the actuation of the second one of the N switching devices to connect the second one of the N PRAM blocks to the power source.

14. The method of claim 11, further comprising resetting the counter value each time when a digital sample is received.

* * * * *